United States Patent
Lerner (10) Patent No.: US 11,046,271 B2
(45) Date of Patent: Jun. 29, 2021

(54) VEHICLE DROWNING SENSING SYSTEM

(71) Applicant: Toyota Motor North America, Inc., Plano, TX (US)

(72) Inventor: Emily S. Lerner, McKinney, TX (US)

(73) Assignee: Toyota Motor North America, Inc., Plano, TX (US)

(*) Notice: Subject to any disclaimer, the term of this patent is extended or adjusted under 35 U.S.C. 154(b) by 198 days.

(21) Appl. No.: 16/171,269

(22) Filed: Oct. 25, 2018

(65) Prior Publication Data
US 2020/0130622 A1    Apr. 30, 2020

(51) Int. Cl.
| | |
|---|---|
| *B60R 22/00* | (2006.01) |
| *E05F 15/00* | (2015.01) |
| *G05D 1/00* | (2006.01) |
| *G05D 3/00* | (2006.01) |
| *G06F 7/00* | (2006.01) |
| *G06F 17/00* | (2019.01) |
| *B60R 21/01* | (2006.01) |
| *B60W 30/09* | (2012.01) |
| *B60W 50/00* | (2006.01) |
| *G01C 9/00* | (2006.01) |
| *B60R 21/00* | (2006.01) |
| *B60K 6/26* | (2007.10) |
| *E05D 7/12* | (2006.01) |
| *G01S 19/13* | (2010.01) |
| *G01N 27/04* | (2006.01) |

(52) U.S. Cl.
CPC ............ *B60R 21/01* (2013.01); *B60W 30/09* (2013.01); *B60W 50/0098* (2013.01); *B60K 6/26* (2013.01); *B60R 2021/0016* (2013.01); *B60R 2021/01265* (2013.01); *B60R 2021/01286* (2013.01); *B60W 2050/0089* (2013.01); *B60W 2555/20* (2020.02); *B60Y 2200/92* (2013.01); *E05D 7/121* (2013.01); *E05Y 2900/531* (2013.01); *G01C 9/00* (2013.01); *G01N 27/048* (2013.01); *G01S 19/13* (2013.01)

(58) Field of Classification Search
CPC ... B60R 21/01; B60W 30/09; B60W 50/0098; B60W 2555/20
USPC .......................................................... 701/45
See application file for complete search history.

(56) References Cited

U.S. PATENT DOCUMENTS

| | | |
|---|---|---|
| 6,337,550 B1 | 1/2002 | Takahashi et al. |
| 6,551,159 B1 | 4/2003 | Spinelli et al. |
| 6,650,244 B1 | 11/2003 | Chen et al. |
| 7,287,482 B1 | 10/2007 | Banchetto et al. |

(Continued)

FOREIGN PATENT DOCUMENTS

| | | |
|---|---|---|
| CN | 103661173 | 3/2014 |
| CN | 104908646 | 9/2015 |

(Continued)

*Primary Examiner* — Mahmoud S Ismail
(74) *Attorney, Agent, or Firm* — Snell & Wilmer L.L.P.

(57) ABSTRACT

Methods, systems, and apparatus for automatically responding to at least partial submersion of a vehicle in water. The system includes a sensor configured to detect sensor data indicating whether the vehicle is at least partially submerged in water. The system includes an electronic control unit (ECU) connected to the sensor. The ECU is configured to determine that the vehicle is at least partially submerged in water based on the sensor data. The ECU is also configured to adjust at least one feature of the vehicle in response to the determination that the vehicle is at least partially submerged in water.

16 Claims, 9 Drawing Sheets

(56) References Cited

U.S. PATENT DOCUMENTS

| | | | |
|---|---|---|---|
| 7,375,625 B2 | 5/2008 | Fujioka | |
| 9,290,144 B1 * | 3/2016 | Cox | B60R 21/013 |
| 9,600,997 B1 | 3/2017 | Abrahams et al. | |
| 10,018,475 B2 | 7/2018 | Hakeem et al. | |
| 10,384,648 B1 * | 8/2019 | Chapin | B60R 25/257 |
| 2015/0204682 A1 | 7/2015 | Dutta Choudhury et al. | |
| 2015/0370259 A1 * | 12/2015 | Sheu | B60J 7/0573 |
| | | | 701/49 |
| 2017/0192423 A1 | 7/2017 | Rust et al. | |
| 2018/0239948 A1 * | 8/2018 | Rutschman | G06K 9/46 |
| 2019/0392697 A1 * | 12/2019 | Perez Barrera | G05D 1/0088 |

FOREIGN PATENT DOCUMENTS

| | | |
|---|---|---|
| DE | 102010046765 | 5/2011 |
| JP | H10221090 | 8/1998 |
| JP | H11287068 | 10/1999 |

* cited by examiner

VEHICLE DROWNING SENSING SYSTEM

BACKGROUND

1. Field

This specification relates to a system and a method for automatically sensing whether a vehicle is submerged in water or the water level has reached the passenger compartment.

2. Description of the Related Art

A vehicle may unintentionally become submerged in water. The vehicle may be accidentally driven into water, or the vehicle may be caught in a location where flooding occurs or a big rain storm is occurring. The safety of the occupants of the vehicle may be put in jeopardy when the vehicle is submerged in water or the water level has reached the passenger compartment. When a vehicle is submerged in water, a panic may set in for the occupants of the vehicle, and they may not quickly be able to determine the proper steps to take to address their safety. In addition, some occupants may not even be aware that they are in danger.

Therefore, there is a need for a system and a method for automatically sensing whether a vehicle is submerged in water or the water level has reached the passenger compartment.

SUMMARY

What is described is a system for automatically responding to at least partial submersion of a vehicle in water. The system includes a sensor configured to detect sensor data indicating whether the vehicle is at least partially submerged in water. The system includes an electronic control unit (ECU) connected to the sensor. The ECU is configured to determine that the vehicle is at least partially submerged in water based on the sensor data. The ECU is also configured to adjust at least one feature of the vehicle in response to the determination that the vehicle is at least partially submerged in water.

Also described is a method for automatically responding to at least partial submersion of a vehicle in water. The method includes detecting, by a sensor, sensor data indicating whether the vehicle is at least partially submerged in water, the sensor being at least one of a moisture sensor configured to detect moisture data, an orientation sensor configured to detect orientation data, an image sensor configured to detect image data, a humidity sensor configured to detect humidity data, a location sensor configured to detect location data, and/or an input device configured to receive an input from an occupant of the vehicle. The method also includes determining, by an electronic control unit (ECU), that the vehicle is at least partially submerged in water based on the sensor data. The method also includes adjusting, by the ECU, at least one feature of the vehicle in response to the determination that the vehicle is at least partially submerged in water, the at least one feature being at least one of a window of the vehicle, a seat belt of the vehicle, a door of the vehicle, an engine of the vehicle, or a motor/generator of the vehicle.

Also described is a vehicle that is at least partially submerged in water. The vehicle includes a sensor configured to detect sensor data indicating whether the vehicle is at least partially submerged in water. The vehicle includes an electronic control unit (ECU) connected to the sensor. The ECU is configured to determine that the vehicle is at least partially submerged in water based on the sensor data. The ECU is also configured to adjust at least one feature of the vehicle in response to the determination that the vehicle is at least partially submerged in water.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for automatically sensing whether a vehicle is submerged or partially submerged in water. The systems, vehicles, and methods disclosed herein detect whether the vehicle is partially or completely submerged in water, and perform one or more actions to assist occupants from exiting the vehicle when it is detected that the vehicle is at least partially submerged in water. In some embodiments, when the vehicle detects that the vehicle is submerged in water when the vehicle is parked, the vehicle automatically drives to a location where there is little to no flooding or water. For example, to a higher elevation location or a safe location where there is little to no flooding or water. The vehicle may use a plurality of sensors in determining whether the vehicle is submerged or partially submerged in water, in order to improve the accuracy of detection of the vehicle being submerged or partially submerged. The vehicle may also compare the data detected by the plurality of sensors with historical sensor data, in order to reduce the number of incorrect detections of the vehicle being submerged or partially submerged in water.

The systems and methods described herein are more accurate and comprehensive than other systems for detecting that the vehicle has encountered water or flooding. In addition, the systems and methods described herein automatically perform one or more actions to assist the occupants in safely exiting the vehicle. Conventionally, when a vehicle with occupants inside becomes submerged or partially submerged in water, the occupants may be overcome with fright, and may not be able to think clearly and responsively. In addition, certain situations or circumstances may prevent the occupants from safely exiting the vehicle even if the occupants are aware of the situation and act quickly. For example, the occupants may have difficulty releasing their seat belts or the windows that are closed may not be able to be opened due to the water pressure or other factors without breaking the windows. Breaking a window from the inside of a vehicle without tools may be difficult for anyone in any situation, let alone an occupant in a vehicle that is submerged or partially submerged in water.

The systems and methods described herein promote the safety of occupants within the vehicle, and promote the safety of emergency responders who put their own lives at risk when rescuing occupants in submerged or partially submerged vehicles.

FIGS. 1, 2, 3A-3D, and 4 illustrate various ways a vehicle may detect that it is submerged or partially submerged in water, according to various embodiments of the invention. As used herein, "submerged in water" may mean that the vehicle is partially or completely submerged in water or any other non-gas liquid.

Figure 1:
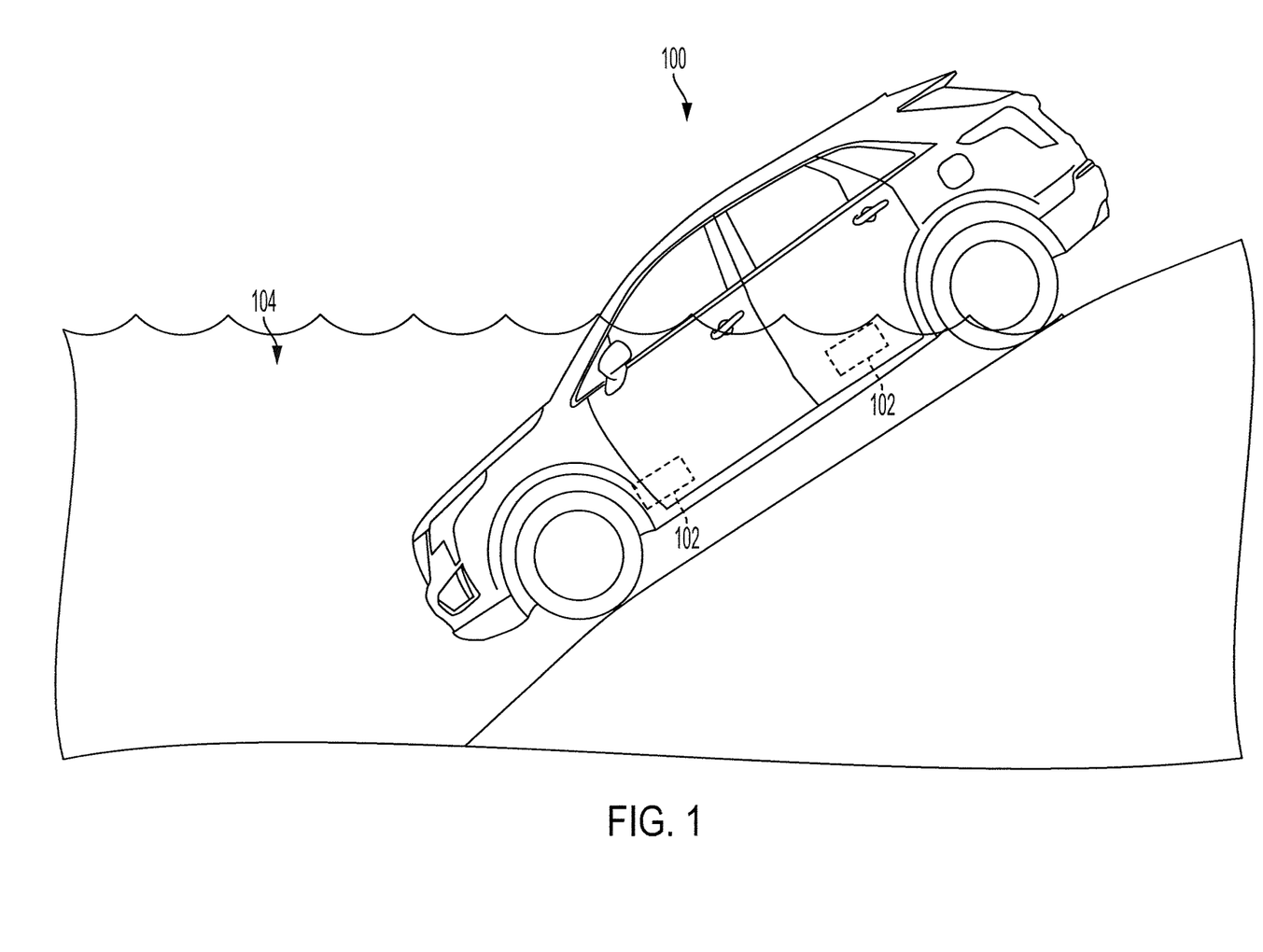
FIG. 1 illustrates a moisture sensor and an orientation sensor-based detection of a vehicle being submerged in water, according to various embodiments of the invention.

FIG. 1 illustrates a moisture sensor and an orientation sensor-based detection of a vehicle being submerged in water. A vehicle 100 that is partially submerged in water 104 is shown in FIG. 1 for illustrative purposes. The vehicle 100 may have been driven into the water 104 on accident, or may have rolled into the water 104 due to a failure of the vehicle's parking brake. In any case, the vehicle 100 is partially in the water 104 and may imminently become fully submerged in the water 104.

The vehicle 100 may include moisture sensors 102 configured to detect the presence of water 104. The moisture sensors 102 may be any device capable of detecting the presence of moisture, such as water detectors, which rely on the electrical conductivity of water to decrease the resistance across two contacts. While illustrated in FIG. 1 as being located on the bottom portion of the vehicle 100, the moisture sensors 102 may be located on any part of the vehicle 100, and there may be any number of moisture sensors 102 on the vehicle 100. For example, the moisture sensors 102 may be located or positioned on the undercarriage of the vehicle 100, proximal to the powertrain of the vehicle 100, within the passenger cabin of the vehicle 100, on the roof of the vehicle 100, on the trunk of the vehicle 100, on the door handles of the vehicle 100, in the wheel wells of the vehicle 100, or on a tire or a rim of the vehicle 100.

The vehicle 100 may also include an orientation sensor 106 configured to detect orientation data, including a roll, a pitch, and a yaw of the vehicle 100. The orientation sensor 106 may be a gyroscope or an inertial measurement unit, for example. The orientation sensor 106 may detect that the current pitch of the vehicle 100 is a current pitch angle 108 away from level. Similarly, the orientation sensor 106 may detect that the current roll of the vehicle 100 is a current roll angle away from level, and the orientation sensor 106 may detect that the current yaw of the vehicle 100 is a current yaw angle.

Figure 5:
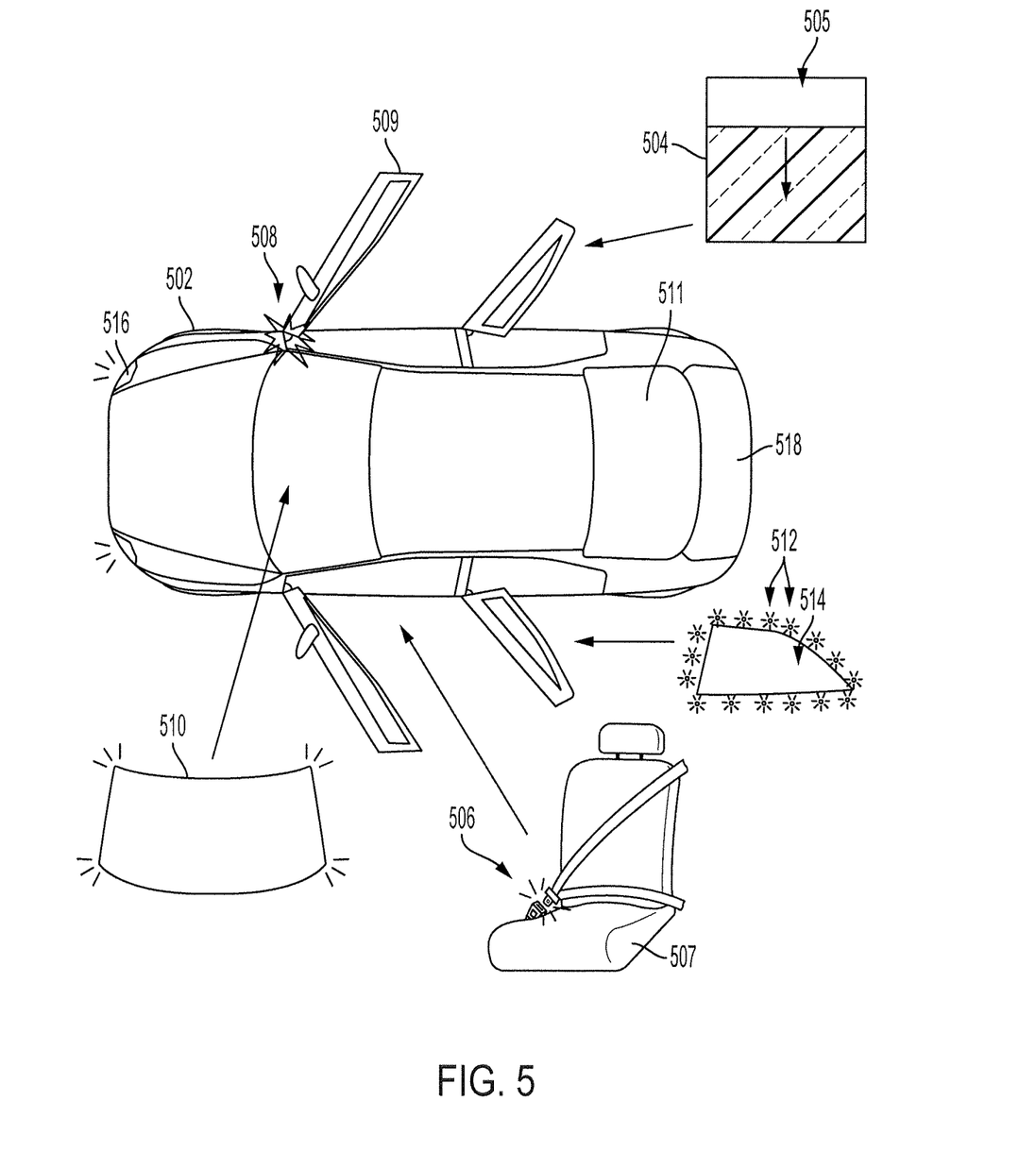
FIG. 5 illustrates actions taken by the vehicle when the vehicle detects submersion in water, according to various embodiments of the invention.
Figure 6A:
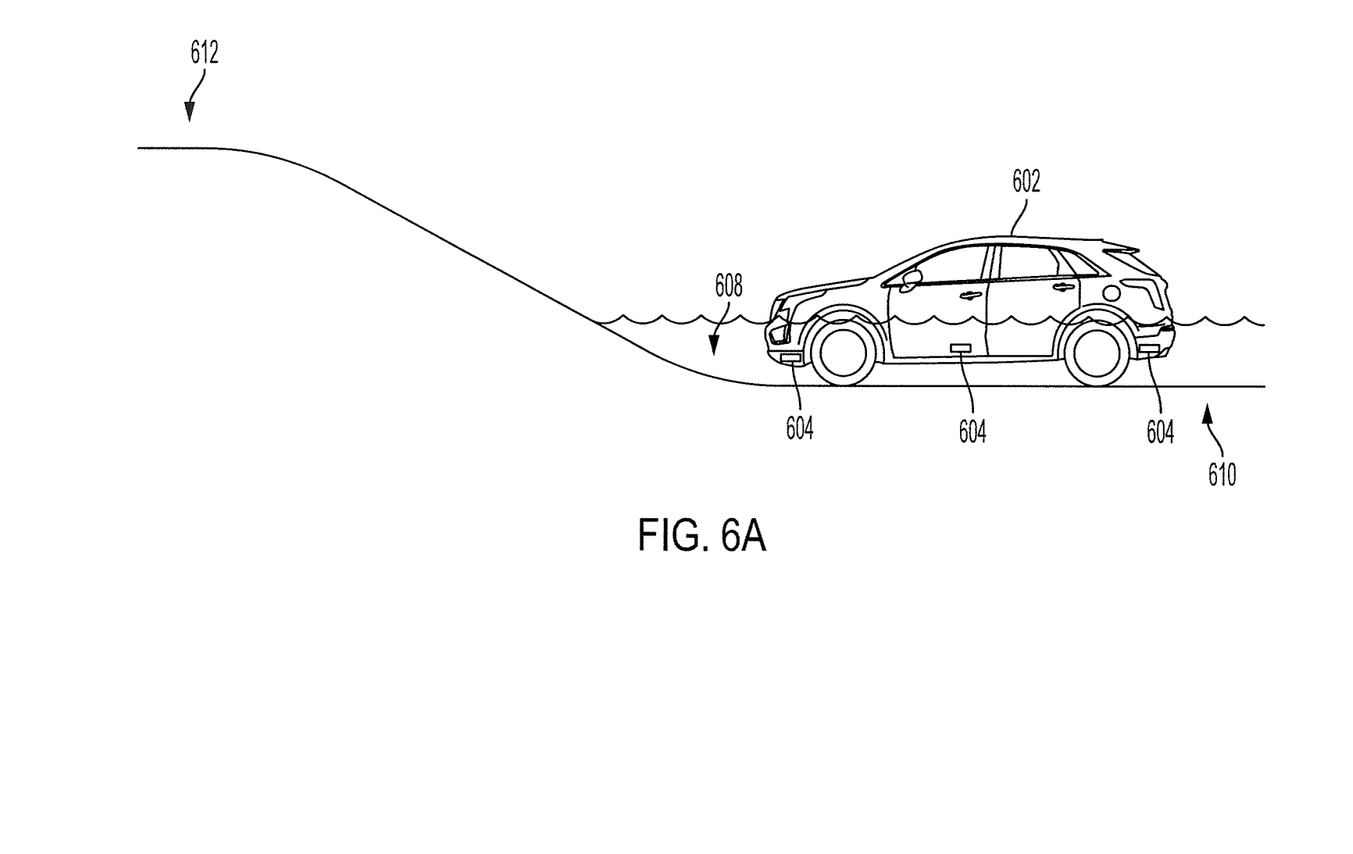
FIGS. 6A-6B illustrate actions taken by an autonomous vehicle when the autonomous vehicle detects submersion in water, according to various embodiments of the invention.
Figure 6B:
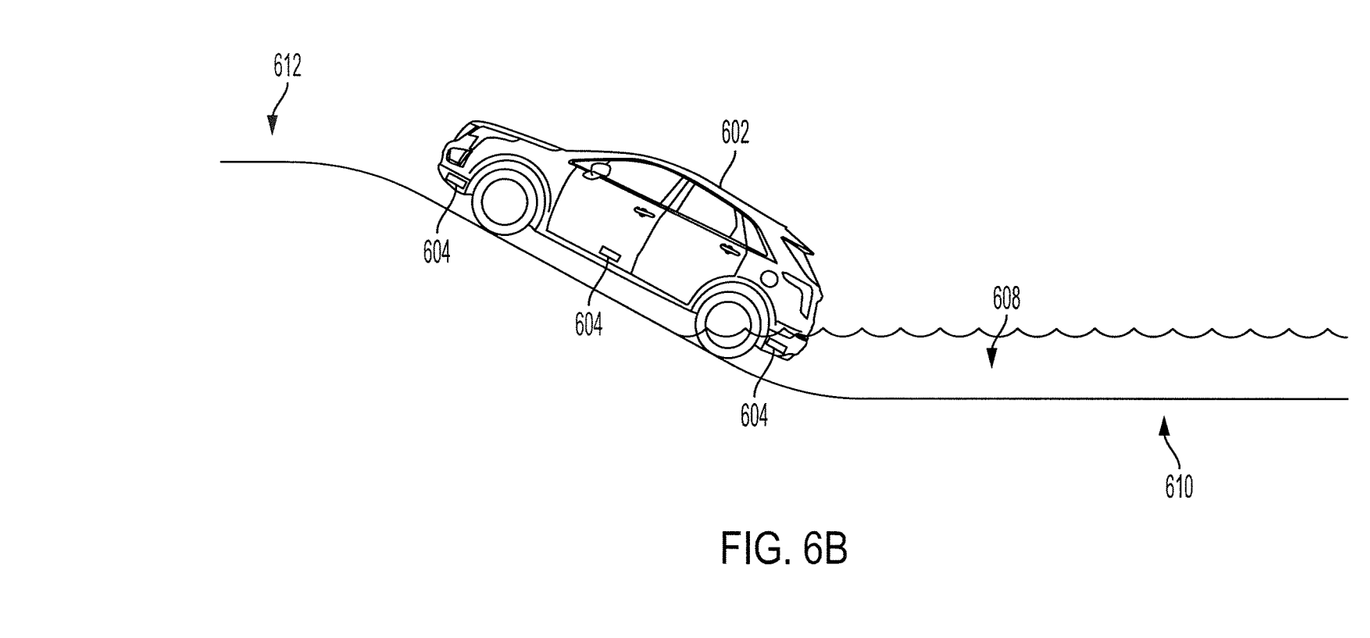

The moisture sensors 102 may detect the presence of water 104 and alert the vehicle to perform actions in response to the detection of water, as shown in FIGS. 5 and 6A-6B. In some embodiments, when the moisture sensors 102 detect the presence of water 104, the orientation data detected by the orientation sensor 106 may be referenced to corroborate the detection of water by the moisture sensors 102. In some embodiments, the actions in response to the detection of water are only performed if the moisture sensors 102 detect the presence of water 104 and the orientation sensor 106 detects that the current pitch angle of the vehicle exceeds a threshold pitch angle. In some embodiments, the actions in response to the detection of water are only performed if the moisture sensors 102 detect the presence of water 104 and the orientation sensor 106 detects that the current roll angle of the vehicle exceeds a threshold roll angle. In some embodiments, the actions in response to the detection of water are only performed if the moisture sensors 102 detects that the water level has risen to the wheel wells or to the door handles.

Although the moisture sensors 102 and the orientation sensor 106 may reliably detect whether the vehicle 100 is partially or fully submerged in water, other sensors may be used.

Figure 2:
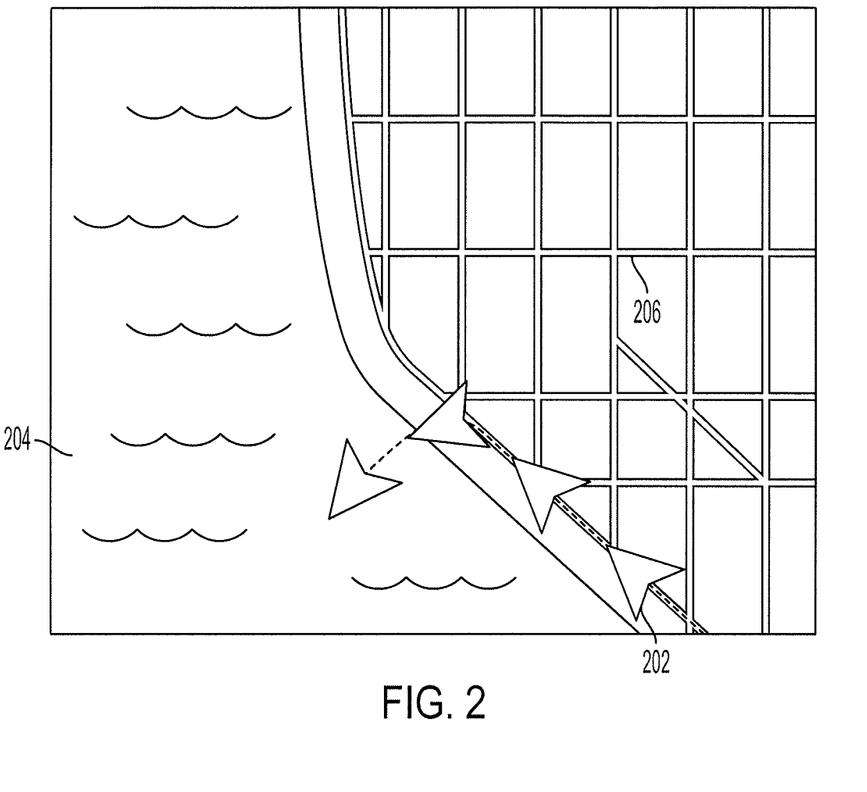
FIG. 2 illustrates a location-based detection of a vehicle being submerged in water, according to various embodiments of the invention.

FIG. 2 illustrates a map and a vehicle icon 202 representing the geographical location of the vehicle (e.g., vehicle 100). The geographical location of the vehicle may be detected by a GPS unit configured to detect location data associated with the vehicle. Map data stored in a memory of the vehicle may be used to determine the location of the vehicle on a map based on the detected location data. The map may indicate what areas are land and what areas are water. For example, the GPS unit may detect location data in the form of latitude and longitude coordinates. The GPS unit may detect a current location of the vehicle as 37.878946 latitude, −122.317034 longitude. The map data may indicate that 37.878946 latitude, −122.317034 longitude is inside a body of water. In another example, the GPS unit may detect a current location of the vehicle as 37.879881 latitude, −122.269383 longitude. The map data may indicate that 37.879881 latitude, −122.269383 longitude is on land.

The vehicle icon 202 may begin at a first location 208A on land 206. The vehicle may move to a second location 208B and then a third location 208C. At the third location 208C, the vehicle may turn toward the water 204, and at the fourth location 208D, the vehicle may be at a geographic location corresponding to a location inside a body of water. When the location data detected by the GPS unit and the map data stored in memory indicate that the vehicle is currently inside a body of water, the vehicle may perform actions in response to the detection of location inside a body of water, as discussed further herein.

In some embodiments, determining whether the vehicle is located in a body of water according to the location data and the map data is performed in response to a detection of water by other devices (e.g., moisture sensors and/or orientation sensors). In some embodiments, detecting of water by other devices (e.g., moisture sensors and/or orientation sensors) is performed in response to determining that the vehicle is located in a body of water according to the location data and the map data.

Additional other sensors may be used to detect the vehicle being submerged in water. FIGS. 3A-3D illustrate a process of detecting entry of the vehicle into water based on image data detected from an image sensor. The image sensor may be a camera configured to detect image data. The image data may be single image detections or a series of image detections in sequence. The image sensor may be one or more image sensors located on the exterior or the interior of the vehicle. The image sensors may be directed in any number of directions, such as the front direction, side directions, and the back direction, for example.

Figure 3A:
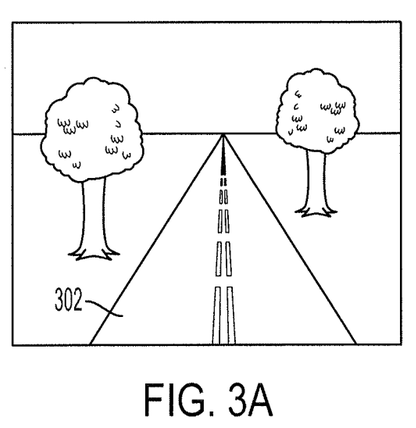
FIGS. 3A-3D illustrate an image sensor-based detection of a vehicle being submerged in water, according to various embodiments of the invention.

FIG. 3A illustrates a first image of the image data detected by the image sensor. The image sensor used to detect the image data in FIGS. 3A-3D may be directed toward the front of the vehicle. The first image includes a road and objects on the side of the road. The vehicle may be configured to automatically detect objects in the image data. In this case, the vehicle may be configured to automatically detect the road 302, and as long as the road 302 is detected in the image data, the vehicle determines that the vehicle is not in water. In some embodiments, the vehicle is trained using training data of objects commonly appearing in the image data of the image sensors, and the vehicle is capable of using machine learning to identify various objects in the image data, such as the road 302.

Figure 3B:
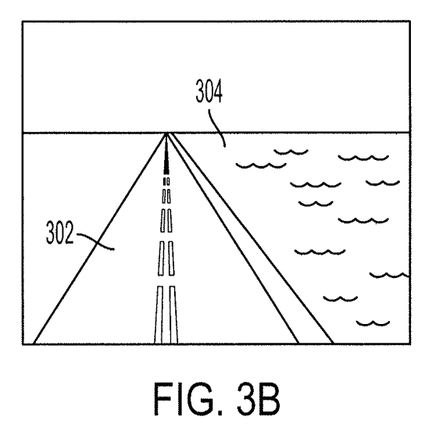

FIG. 3B illustrates a second image of the image data detected by the image sensor. The second image also includes the road 302, but also includes water 304. The vehicle may be configured to automatically detect the road 302 as well as the water 304. The vehicle may determine the location of the road 302 relative to the direction the vehicle is travelling in. As shown in FIG. 3B, the road 302 is in front of the vehicle and the water 304 is to the side, so the vehicle may not detect a water submersion event.

Figure 3C:
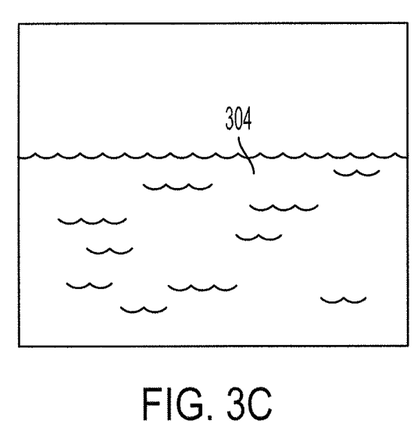

FIG. 3C illustrates a third image of the image data detected by the image sensor. The third image includes only water 304. The vehicle may be configured to automatically detect that only water is in the third image. In some embodiments, at this point, the vehicle may detect an imminent submersion of water by the vehicle, and the vehicle may rely on other devices (e.g., moisture sensors, orientation sensors, and/or GPS unit) to verify whether the vehicle is in a body of water.

Figure 3D:
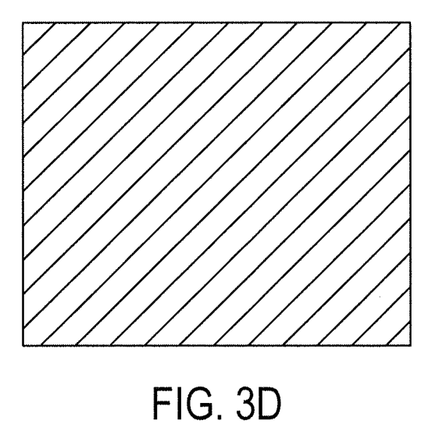

FIG. 3D illustrates a fourth image of the image data detected by the image sensor. The fourth image is completely dark. The vehicle may be configured to recognize that the detection of only water 304 in the third figure followed by the detection of only darkness in the fourth image is associated with the vehicle entering the water 304 and being submerged in the water. In some embodiments, the vehicle may use other devices (e.g., moisture sensors, orientation sensors, and/or GPS unit) to verify whether the vehicle is indeed inside a body of water.

Figure 4:
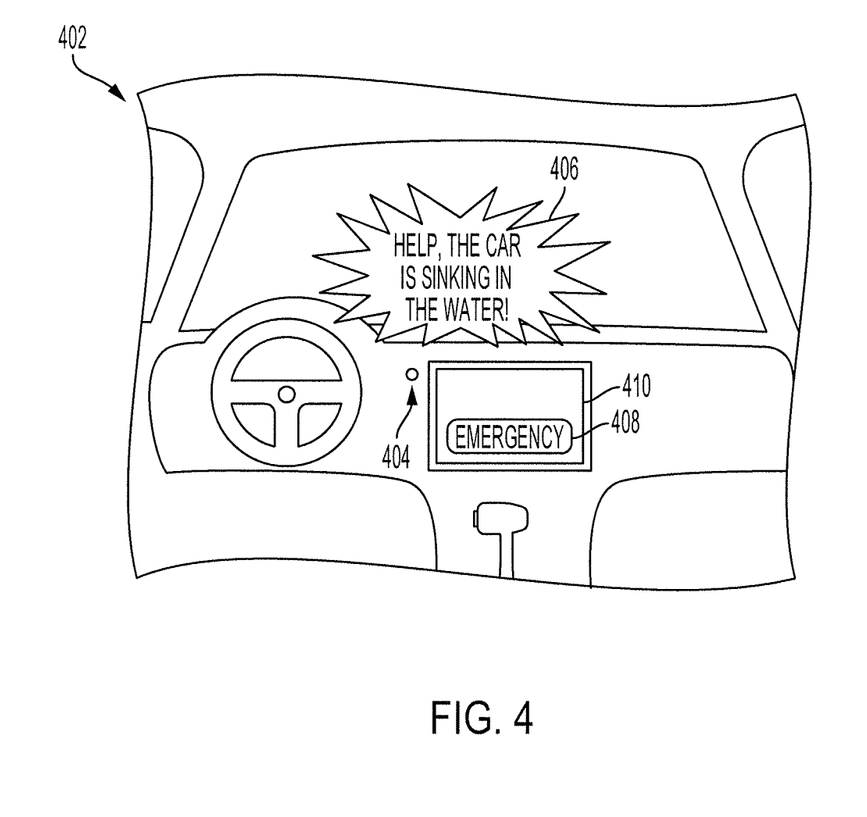
FIG. 4 illustrates a microphone or touchscreen-based detection of a vehicle being submerged in water, according to various embodiments of the invention.

In addition to sensors and devices directed to the outside of the vehicle, sensors inside the vehicle may be used to detect that the vehicle is being submerged in water. FIG. 4 illustrates the passenger cabin 402 of the vehicle. The passenger cabin 402 may include a microphone 404 configured to detect sound data and a display screen 410 configured to display information as well as to receive indications from a user when the display screen 410 is a touch screen display.

In some embodiments, an occupant of the vehicle (e.g., driver or passenger) may provide an indication to the vehicle that the vehicle is entering the body of water. The occupant may speak an utterance 406 detected by the microphone 404 of the vehicle. The vehicle may analyze the utterance 406 using speech recognition technology to detect that the vehicle is entering the body of water. For example, the utterance 406 may include the words "water" and "sinking" and "help" which signal to the vehicle that the vehicle may be entering the body of water. In some embodiments, the utterance 406 includes an activation word, such as "help" or "hey car" and the microphone 404 is prompted to perform speech recognition on the words following the activation word.

The occupant of the vehicle may also provide an indication to the vehicle that the vehicle is entering the body of water by activating a button 408 on the display screen 410 or engaging an emergency button located elsewhere in the passenger cabin 402.

The vehicle may detect that the vehicle is entering a body of water using any combination of the moisture sensor 102 of FIG. 1, the orientation sensor 106 of FIG. 1, the GPS unit and location data as illustrated in FIG. 2, the image sensor, as illustrated in FIGS. 3A-3D, the microphone 404 of FIG. 4, or the button 408 of FIG. 4.

Once the vehicle has detected that it is entering or within a body of water, the vehicle may perform various actions to assist any occupants in the vehicle. Occupants of the vehicle may drown if they are unable to exit the vehicle as the vehicle begins to sink into the body of water. The further the vehicle sinks with the occupants trapped inside, the harder it will be for the occupants to survive. The vehicle may perform actions to assist any occupants within the vehicle from being able to exit the vehicle, as shown in FIG. 5.

The vehicle 502, once it has detected that it is in the water, may automatically lower its windows 504 so that any occupants may exit the vehicle through the window opening 505. In some embodiments, the vehicle 502 may be able to detect which windows are submerged in water, and which windows are not yet submerged, and only open those windows that are not submerged. In other embodiments, all windows are automatically opened.

The vehicle 502, once it has detected that it is in the water, may automatically release the seat belts 506 to allow any occupants to be free to leave the vehicle 502 without struggling to release the seat belt latch. In some embodiments, the seat cushion 507 or some portion thereof also releases and may be used as a flotation device.

The vehicle 502, once it has detected that it is in the water, may automatically unlock and open all of its doors 509. In some embodiments, the hinges 508 of the doors 509 can be automatically unlatched or automatically disengaged in order to release the door 509 from the vehicle 502. The hinges 508 may be disengaged by one or more holding pins automatically being removed from the hinge 508.

The vehicle 502, once it has detected that it is in the water, may automatically lower or release the front window 510 and/or the rear window 511 so that any occupants inside of the vehicle 502 may exit the vehicle 502 via the front window 510 or the rear window 511. In some embodiments, a seam connecting the front window 510 or the rear window 511 to the vehicle 502 may be automatically removed to release the front window 510 or the rear window 511.

The vehicle 502, once it has detected that it is in the water, may automatically light up one or more lights 512 surrounding the window openings 514 of the vehicle 502. The one or more lights 512 may assist an occupant in locating the window openings 514 through which the occupant may exit the vehicle 502.

The vehicle 502, once it has detected that it is in the water, may automatically turn on its headlights 516 so that the vehicle 502 may be more easily located while it is in the water. The vehicle 502 may also automatically release the trunk 518 or the hatch back door in case any living beings (e.g., humans or animals) located in the trunk 518 may not be trapped while the vehicle 502 is sinking.

In some embodiments, the vehicle includes multiple barometers configured to detect a pressure inside the vehicle and outside the vehicle, and the windows and doors of the vehicle may open after the pressure inside the vehicle and the pressure outside of the vehicle has stabilized. That is, when the pressure data detected inside of the vehicle by one or more interior barometers is within a threshold pressure of the pressure data detected outside of the vehicle by one or more exterior barometers, the windows and/or the doors of the vehicle may automatically open. This may be performed in order to avoid a sudden influx of water into the vehicle, which may accelerate the sinking of the vehicle as air within the vehicle is displaced by water.

In some embodiments, one or more speakers of the vehicle makes a noise in order for the vehicle to be more easily located by emergency responders. In some embodiments, the vehicle emits a distress data signal using a transceiver to an emergency service. The distress data signal may include the location of the vehicle, occupant identification data, as well as vehicle data, such as make, model, color, and year of the vehicle.

In addition, in some embodiments, the vehicle may provide instructions to the occupants of the vehicle using one or more speakers of the vehicle. The instructions may include advice on how to avoid being sucked into the current when the vehicle goes down. The instructions may also include information regarding the current situation and regarding transmission of an emergency request. For example, the one or more speakers may produce the following: "The vehicle is sinking. Emergency services have been contacted. Please remain calm and exit the vehicle via the windows and use the detachable seat cushion as a life preserver." The one or more speakers may also provide a countdown prior to the opening of the windows or the opening of doors, so that the occupants can anticipate the opening and subsequent possible influx of water.

In addition to performing various actions to assist any occupants in the vehicle, when the vehicle is an autonomous or semi-autonomous vehicle capable of self-driving, the vehicle may automatically drive itself away from detected water. In some embodiments, the autonomous vehicle may attempt to reverse, if it detects that it is driving into water and there may be an opportunity to reverse gears and drive back onto land. In some embodiments, the autonomous vehicle may analyze weather data, traffic data, emergency warning data, and/or information regarding flooded areas, and avoid particular areas when a risk of flooding in those particular areas exceeds a threshold risk level. In some embodiments, the autonomous vehicle drives itself to higher ground when the vehicle is stationary, and it detects the presence of water or that a storm is coming and the current vehicle location is in an area that might flood. In some embodiments, the autonomous vehicle drives itself to higher ground when the vehicle is stationary and unoccupied, and it detects that the water level is travelling up the vehicle tire. FIGS. 6A-6B illustrate the semi-autonomous or fully autonomous vehicle driving itself to higher ground.

As shown in FIG. 6A, the vehicle 602 is at a first location 610 where water 608 has pooled around the vehicle 602. The vehicle 602 may be parked in a basement parking lot, and heavy rainfall may have flooded the parking lot and caused the water 608 to pool around the vehicle 602.

The vehicle 602, using any of the devices and methods described herein for detecting the presence of water, may detect that the vehicle 602 is currently in water 608. As illustrated in FIG. 6A, the vehicle 602 may have moisture sensors 604 configured to detect the presence of the water 608.

Once the vehicle 602 has detected the water 608, the vehicle 602 may determine whether it can safely be driven to another location, such as second location 612. The vehicle 602 may use stored map data and spatial sensors and imaging sensors to determine whether there is another location the vehicle 602 can be driven to.

As shown in FIG. 6B, the vehicle 602 determines that it can safely be driven to the second location 612, and the vehicle 602 drives toward the second location 612. In some embodiments, the vehicle 602 may drive until the moisture sensors 604 indicate that there is no water 608 surrounding the vehicle 602. In some embodiments, the vehicle 602 determines a safe location to drive to, and stops and parks when the safe location is reached.

Figure 7:
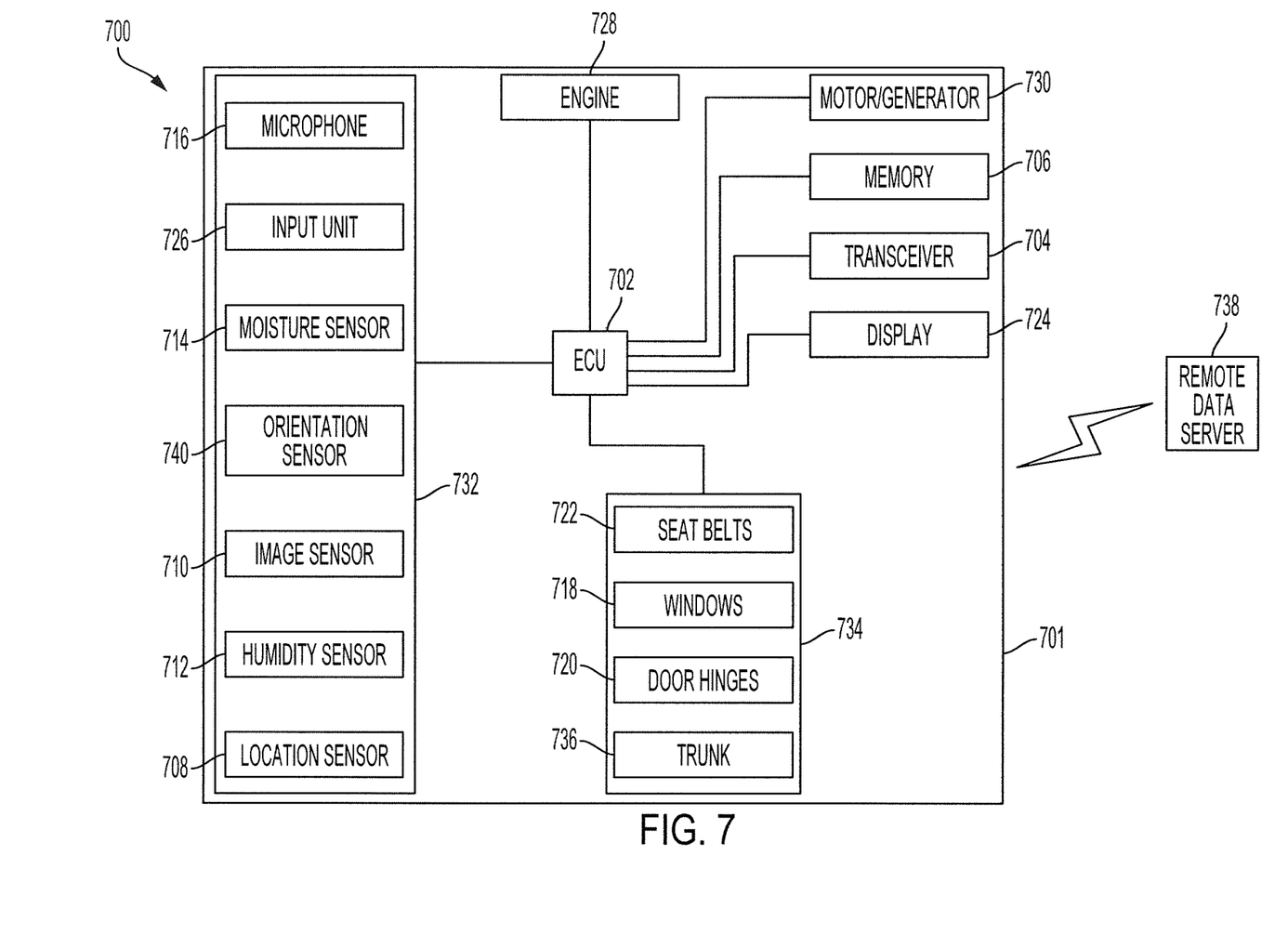
FIG. 7 is a block diagram of an example vehicle drowning sensing system, according to various embodiments of the invention.

FIG. 7 illustrates an example system 700, according to various embodiments of the invention. The system may include a vehicle 701 (e.g., the vehicle 100). The vehicle 701 may have an automatic or manual transmission. The vehicle 701 is a conveyance capable of transporting a person, an object, or a permanently or temporarily affixed apparatus. The vehicle 701 may be a self-propelled wheeled conveyance, such as a car, a sports utility vehicle, a truck, a bus, a van or other motor or battery driven vehicle. For example, the vehicle 701 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 701 may be a semi-autonomous vehicle or an autonomous vehicle. That is, the vehicle 701 may be self-maneuvering and navigate without human input. An autonomous vehicle may use one or more sensors and/or a navigation unit to drive autonomously.

The vehicle 701 also includes one or more computers or electronic control units (ECUs) 702, appropriately programmed, to control one or more operations of the vehicle 701. The one or more ECUs 702 may be implemented as a single ECU or in multiple ECUs. The ECU 702 may be electrically coupled to some or all of the components of the vehicle 701. In some embodiments, the ECU 702 is a central ECU configured to control one or more operations of the entire vehicle. In some embodiments, the ECU 702 is multiple ECUs located within the vehicle and each configured to control one or more local operations of the vehicle. In some embodiments, the ECU 702 is one or more computer processors or controllers configured to execute instructions stored in a non-transitory memory 706.

Although FIG. 7 illustrates all of the elements connected to the ECU 702, the elements of the vehicle 701 may be connected to each other using a communications bus.

The vehicle 701 may be coupled to a network. The network, such as a local area network (LAN), a wide area network (WAN), a cellular network, a digital short-range communication (DSRC), the Internet, or a combination thereof, connects the vehicle 701 to a remote data server 738. The remote data server 738 may be one or more servers from different service providers. Each of the one or more servers may be connected to one or more databases. A service provider may provide navigational map, weather and/or traffic data to the vehicle.

A database is any collection of pieces of information that is organized for search and retrieval, such as by a computer or a server, and the database may be organized in tables, schemas, queries, report, or any other data structures. A database may use any number of database management systems and may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

The navigational map information includes political, roadway and construction information. The political information includes political features such as cities, states, zoning ordinances, laws and regulations, and traffic signs, such as a stop sign, or traffic signals. For example, laws and regulations may include the regulated speed on different portions of a road or noise ordinances. The roadway information includes road features such the grade of an incline of a road, a terrain type of the road, or a curvature of the road. The construction information includes construction features such as construction zones and construction hazards.

The features, e.g., road features, political features, or traffic data, each have a location that may be identified by map coordinates. The map coordinates may be defined by latitude and longitude coordinates.

The transceiver 704 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The transceiver 704 may transmit data to and receive data from devices and systems not directly connected to the vehicle. For example, the ECU 702 may communicate with the remote data server 738. Furthermore, the transceiver 704 may access the network, to which the remote data server 738 is also connected.

The vehicle 701 may receive weather data from the remote data server 738. The weather data may be used by the ECU 702 in determining whether detection of water or moisture by one or more of the sensors in the sensor array 732 may be caused by precipitation. In some embodiments, when the weather data indicates that there is precipitation (e.g., rain, snow, hail, sleet) present where the vehicle 701 is located, the ECU 702 may use the sensor data from sensors which are not reliant on moisture detection (e.g., location sensor 708, orientation sensor 740, input unit 726, or microphone 716) to determine that the vehicle is submerged in water.

The vehicle 701 includes a sensor array 732 connected to the ECU. The sensor array includes a location sensor 708, an image sensor 710, a humidity sensor 712, a moisture sensor 714, a microphone 716, an input unit 726, and an orientation sensor 740.

The location sensor 708 is configured to determine location data. The location sensor 708 may be a GPS unit or any other device for determining the location of the vehicle 701. The ECU 702 may use the location data along with the map data to determine a location of the vehicle. In other embodiments, the location sensor 708 has access to the map data and may determine the location of the vehicle and provide the location of the vehicle to the ECU 702. The ECU 702 may use the location sensor 708 and map data stored in memory 706 to determine whether the vehicle is in a body of water, as illustrated in FIG. 2.

The image sensor 710 is configured to detect image data of the road and any objects the vehicle may be approaching. The ECU 702 uses the image data from the image sensor to determine whether the vehicle is approaching and/or submerged within water, as illustrated in FIGS. 3A-3D.

The moisture sensor 714 is similar to moisture sensors 102 and 604. The moisture sensor 714 is configured to detect moisture data. The moisture data may indicate whether the vehicle 701 is submerged in water. As described herein, the moisture sensor 714 may be one or more moisture sensors located in various locations of the vehicle 701.

The humidity sensor 712 is configured to detect humidity data associated with the environment around the vehicle 701. The humidity sensor 712 may be a hygrometer. In some situations, the ECU 702 may improperly determine that the vehicle is submerged in water when the humidity of the environment around the vehicle is sufficiently high. In particular, the ECU 702 may improperly determine based on the moisture data from the moisture sensor 714 that the vehicle is submerged in water. The ECU 702 may use the humidity data from the humidity sensor 712 as a baseline as compared to the moisture data from the moisture sensor 714 to verify that the vehicle is indeed submerged in water.

The input unit 726 is configured to receive input from a user, such as an occupant of the vehicle. The input unit 726 may be a touchscreen display of an infotainment unit, a keyboard, a camera configured to detect motions, or one or more dials and/or buttons. The input unit 726 may be used to receive an indication from the occupant of distress or an emergency situation, as shown in FIG. 4.

The microphone 716 is configured to detect sound data. The sound data may include an utterance by an occupant regarding the state of the vehicle and whether the vehicle is in an emergency situation, such as being submerged in water. The sound data may be used by the ECU 702 to determine that the vehicle is being submerged in water, as shown in FIG. 4.

The orientation sensor 740 is configured to detect orientation data. The orientation sensor 740 may be any sensor configured to detect a position of the vehicle relative to a flat surface (e.g., a roll, a pitch, and a yaw). The orientation sensor 740 may be an inertial measurement unit or a gyroscope, for example. The orientation data may be used by the ECU 702 to determine whether the vehicle 701 is in a position that is outside conventional expected positions. The ECU 702 may use topographical data and/or map data stored in memory, along with the location sensor 708 to determine an expected orientation of the vehicle 701, and may compare the expected orientation of the vehicle with the orientation data detected by the orientation sensor 740. For example, when the orientation data indicates that the vehicle is leaning 50 degrees downward, the topographical data and/or map data corresponding to the location of the vehicle may be referenced, and when the topographical data indicates that a leaning of no more than 3 degrees in any direction is expected at the location of the vehicle, the ECU 702 may determine that the vehicle 701 may be submerged in water. The ECU 702 may use the orientation data as a verification of other detected data, such as moisture data or location data.

The display 724 is configured to display an emergency indicator icon that the occupant may select to communicate to the ECU 702 that the vehicle 701 is currently or imminently underwater. The display 724 may be part of an infotainment unit and may also present navigation instructions and may also provide a map of the current location of the vehicle and/or a desired destination.

The memory 706 is connected to the ECU 702 and may be connected to any other component of the vehicle. The memory 706 is configured to store any data described herein, such as the map data, the location data, historical data associated with each of the sensors in the sensor array 732, and any data received from the remote data server 738 via the transceiver 704.

The historical data associated with each sensor of the sensor array 732 may be used as a baseline to compare the detected sensor data against, in order to provide a more accurate detection of the vehicle 701 being submerged in water.

The historical data may include historical location data associated with the vehicle 701. The historical location data may have an error range associated with each detected location. For example, when the vehicle 701 is close to a beach, the error range may be within 10 feet, but when the vehicle 701 is in the mountains, the error range may be within 50 feet. The historical location data may be referenced when the location data detected by the location sensor 708 indicates that the vehicle 701 is in a body of water, in order to determine whether there may be an error associated with the detection. When there may be an error associated with the detection, one or more other sensors of the sensor array 732 may be used to verify that the vehicle 701 is submerged in water.

The historical data may also include historical image data associated with the vehicle 701. The historical image data may include a record of when a detected object or environment was incorrectly identified. For example, the historical image data may include a confidence of 62% of detection of water. When the confidence of detection of water or the vehicle being submerged in water is below a threshold confidence percentage, one or more other sensors of the sensor array 732 may be used to verify that the vehicle 701 is submerged in water.

The historical data may include historical moisture data associated with the vehicle 701. The historical moisture data may be used to determine a baseline moisture level detected by the moisture sensor 714, and when the difference between the detected moisture data at a given moment compared with the baseline moisture level of the historical moisture data exceeds a threshold amount, then the ECU 702 may determine that the vehicle 701 is submerged in water. When the difference between the detected moisture data at a given moment is greater than the baseline moisture level, but the comparison of the detected moisture data with the baseline moisture level does not exceed the threshold amount, then the ECU 702 may use one or more other sensors of the sensor array 732 to verify that the vehicle 701 is submerged in water.

The historical data may include historical microphone data associated with one or more occupants of the vehicle. The historical microphone data may be used to more accurately calibrate voice detection software used by the ECU 702 to detect a spoken indication from one or more occupants of the vehicle that there is an emergency.

Once the ECU 702 has determined that the vehicle is submerged in water, the ECU 702 may instruct one or more features or devices 734 of the vehicle 701 to perform actions to assist occupants in exiting the vehicle 701, as shown in FIG. 5. The features or devices 734 may include windows 718, door hinges 720, seat belts 722, and a trunk 736.

The windows 718 may include the side windows as well as the front and rear windows. When the windows 718 are controlled by an actuator, the ECU 702 may instruct the windows 718 to lower, from a closed or partially closed state to a fully open state. When the windows 718 are not able to be controlled by an actuator, the ECU 702 may instruct the windows 718 to detach from the vehicle, such as the front windshield. The ECU 702 may also instruct one or more lights surrounding the windows 718 to illuminate, in order to attract the attention of occupants of the vehicle seeking to escape the vehicle.

The door hinges 720 may be powered, allowing the ECU 702 to open the doors of the vehicle when the ECU 702 determines that the vehicle is submerged in water. The door hinges 720 may also be configured to be destroyed or become otherwise detached so that the doors may be disconnected from the body of the vehicle when the ECU 702 determines that the vehicle is submerged in water.

The ECU 702 may instruct the seat belts 722 to detach when the ECU 702 determines that the vehicle is submerged in water. Once the seat belts 722 are automatically detached, the occupants may more easily exit the vehicle.

The ECU 702 may instruct the trunk 736 of the vehicle 701 to open when the ECU 702 determines that the vehicle is submerged in water. In some embodiments, the trunk 736 may be considered another door of the vehicle 701.

The ECU 702 is also connected to the engine 728 and the motor/generator 730 of the vehicle. The vehicle may use the engine 728 and/or the motor/generator 730 based on whether the vehicle is a conventional internal combustion engine vehicle, a hybrid vehicle, or an electric vehicle. The ECU 702 may use the engine 728 and/or the motor/generator 730 to propel the vehicle to another location when the vehicle detects the presence of water, as shown in FIGS. 6A-6B.

As used herein, a "unit" may refer to hardware components, such as one or more computer processors, controllers, or computing devices configured to execute instructions stored in a non-transitory memory.

Figure 8:
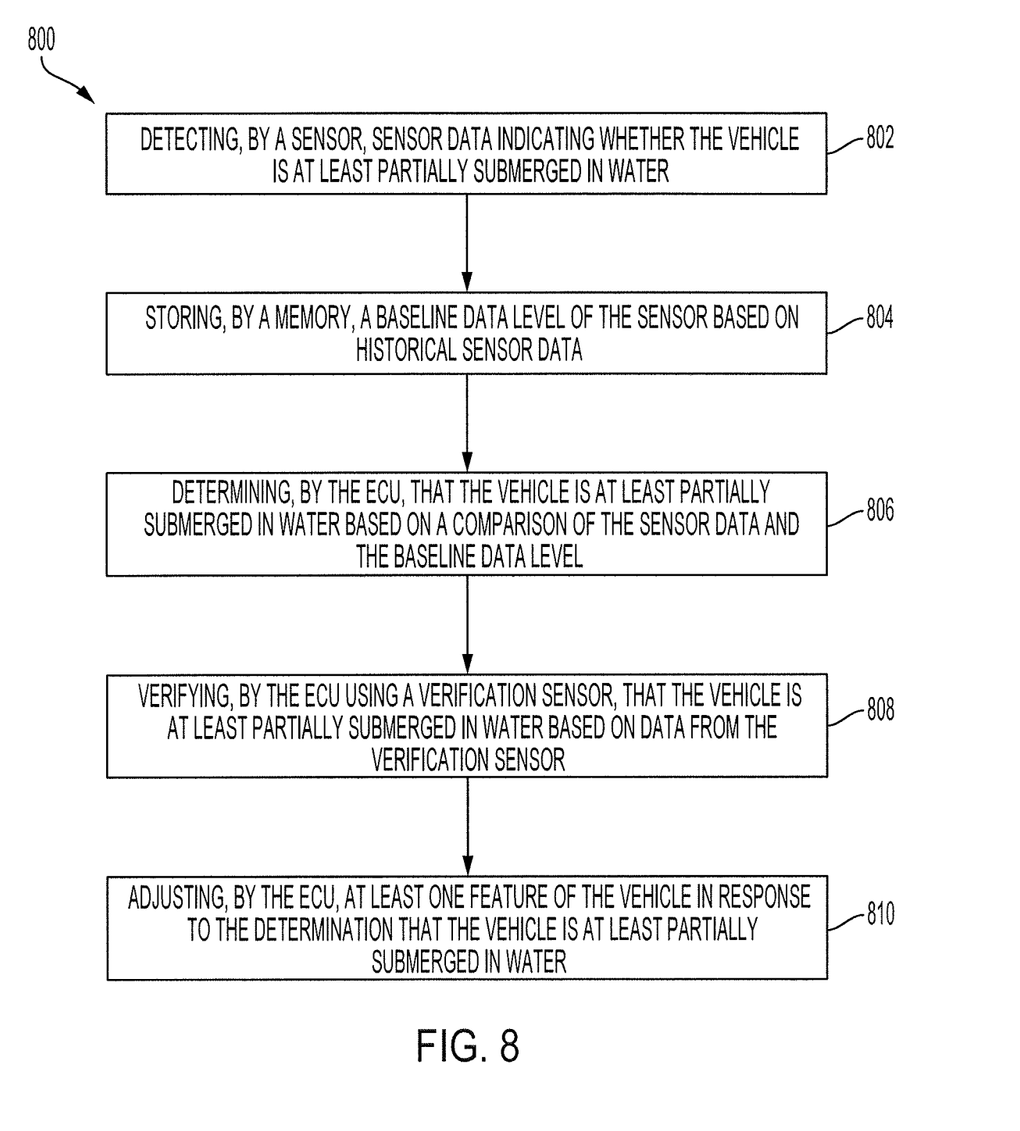
FIG. 8 illustrates a flow diagram of a process performed by the vehicle drowning sensing system, according to various embodiments of the invention.

FIG. 8 illustrates a flowchart of a process 800 performed by the systems described herein. The process 800 may be a method for automatically responding to at least partial submersion of a vehicle (e.g., vehicle 701) in water.

A first sensor detects sensor data indicating whether the vehicle is at least partially submerged in water (step 802). The first sensor may be any of the sensors of a sensor array (e.g., sensor array 732) of the vehicle. The sensor array may include a location sensor (e.g., location sensor 708), an image sensor (e.g., image sensor 710), a humidity sensor (e.g., humidity sensor 712), a moisture sensor (e.g., moisture sensor 714), a microphone (e.g., microphone 716), an input unit (e.g., input unit 726), and an orientation sensor (e.g., orientation sensor 740).

A memory (e.g., memory 706) stores a baseline data level of the first sensor based on historical sensor data (step 804). As described herein, the historical sensor data may be previous measurements of data detected by the first sensor. The historical sensor data may also be received from a remote data server (e.g., remote data server 738) via a vehicle transceiver (e.g., transceiver 704).

The ECU (e.g., ECU 702) determines that the vehicle is at least partially submerged in water based on a comparison of the sensor data and the baseline data level (step 806). In some embodiments, when the sensor data exceeds the baseline data level, the ECU determines that the vehicle is at least partially submerged in water. In other embodiments, when the difference between the sensor data and the baseline data level exceeds a threshold, the ECU determines that the vehicle is at least partially submerged in water.

The ECU verifies, using a verification sensor, that the vehicle is at least partially submerged in water based on data from the verification sensor (step 808). The verification sensor may be any of the sensors of the sensor array that is not the first sensor. By using the verification sensor, the ECU is able to more accurately determine whether the vehicle is at least partially submerged in water. In some embodiments, multiple verification sensors are used. In some embodiments, some of the sensors are paired together, and when a particular sensor is used as the first sensor, a particular second sensor must be used as the verification sensor. When the data from the verification sensor does not indicate that the vehicle is at least partially submerged in water, no further action may be taken.

When the data from the verification sensor does indicate that the vehicle is at least partially submerged in water, the ECU may adjust at least one feature or device of the vehicle (step 810). The feature or device may include windows (e.g., windows 718), door hinges (e.g., door hinges 720), seat belts (e.g., seat belts 722), a trunk (e.g., trunk 736), an engine (e.g., engine 728), and a motor/generator (e.g., motor/generator 730). The adjustment of the at least one feature or device may be as described herein and with respect to FIGS. 5 and 6A-6B.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for automatically responding to at least partial submersion of a vehicle in water, the system comprising:
   a first sensor and a second sensor each configured to detect sensor data indicating whether the vehicle is at least partially submerged in water;
   a memory configured to store historical sensor data from at least the first sensor and store a baseline data level of the first sensor based on the historical sensor data; and
   an electronic control unit (ECU) connected to the first sensor and the second sensor and configured to:
     determine that the vehicle is at least partially submerged in water by:
       receiving the sensor data from the first sensor indicating that the vehicle is at least partially submerged in water,
       comparing the sensor data from the first sensor and the baseline data level of the first sensor, and
       verifying, using the sensor data from the second sensor, whether the vehicle is at least partially submerged in water, to avoid improper determination that the vehicle is at least partially submerged in water; and
     adjust at least one feature of the vehicle in response to the determination that the vehicle is at least partially submerged in water.

2. The system of claim 1, wherein the first sensor is at least one of a moisture sensor configured to detect moisture data, an orientation sensor configured to detect orientation data, an image sensor configured to detect image data, a humidity sensor configured to detect humidity data, a location sensor configured to detect location data, or an input device configured to receive an input from an occupant of the vehicle.

3. The system of claim 1, wherein the at least one feature is at least one of a window of the vehicle, a seat belt of the vehicle, a door of the vehicle, an engine of the vehicle, or a motor/generator of the vehicle.

4. The system of claim 1, wherein the first sensor is an image sensor configured to detect image data of objects and environment in front of the vehicle, and the ECU is configured to determine that the vehicle is at least partially submerged in water by using machine learning techniques to identify that the vehicle has entered a body of water.

5. The system of claim 1, wherein the at least one feature is a door hinge of one or more doors of the vehicle, and wherein the ECU is configured to adjust the door hinge by instructing the door hinge to become detached such that the one or more doors of the vehicle are disconnected from a chassis of the vehicle.

6. The system of claim 1, wherein the at least one feature is an engine or a motor/generator of the vehicle, and wherein the ECU is configured to automatically drive the vehicle to a location where the vehicle will not be at least partially submerged in the water.

7. A vehicle that is at least partially submerged in water, the vehicle comprising:
   a first sensor and a second sensor each configured to detect sensor data indicating whether the vehicle is at least partially submerged in water;
   a memory configured to store historical sensor data from at least the first sensor and store a baseline data level of the first sensor based on the historical sensor data; and
   an electronic control unit (ECU) connected to the first sensor and the second sensor and configured to:
     determine that the vehicle is at least partially submerged in water by:
       receiving the sensor data from the first sensor indicating that the vehicle is at least partially submerged in water,
       comparing the sensor data from the first sensor and the baseline data level of the first sensor, and
       verifying, using the sensor data from the second sensor, whether the vehicle is at least partially submerged in water, to avoid improper determination that the vehicle is at least partially submerged in water; and
     adjust at least one feature of the vehicle in response to the determination that the vehicle is at least partially submerged in water.

8. The vehicle of claim 7, wherein the first sensor is at least one of a moisture sensor configured to detect moisture data, an orientation sensor configured to detect orientation data, an image sensor configured to detect image data, a humidity sensor configured to detect humidity data, a location sensor configured to detect location data, or an input device configured to receive an input from an occupant of the vehicle.

9. The vehicle of claim 7, wherein the at least one feature is at least one of a window of the vehicle, a seat belt of the vehicle, a door of the vehicle, an engine of the vehicle, or a motor/generator of the vehicle.

10. The vehicle of claim 7, wherein the first sensor is an image sensor configured to detect image data of objects and environment in front of the vehicle, and the ECU is configured to determine that the vehicle is at least partially submerged in water by using machine learning techniques to identify that the vehicle has entered a body of water.

11. The vehicle of claim 7, wherein the at least one feature is a door hinge of one or more doors of the vehicle, and wherein the ECU is configured to adjust the door hinge by instructing the door hinge to become detached such that the one or more doors of the vehicle are disconnected from a chassis of the vehicle.

12. The vehicle of claim 7, wherein the at least one feature is an engine or a motor/generator of the vehicle, and wherein the ECU is configured to automatically drive the vehicle to a location where the vehicle will not be at least partially submerged in the water.

13. A method for automatically responding to at least partial submersion of a vehicle in water, the method comprising:

detecting, by a first sensor and a second sensor, sensor data indicating whether the vehicle is at least partially submerged in water;

storing, by a memory, a baseline data level of the first sensor based on stored historical sensor data of the first sensor;

determining, by an electronic control unit (ECU), that the vehicle is at least partially submerged in water by:
  receiving the sensor data from the first sensor, the first sensor being at least one of a moisture sensor configured to detect moisture data, an orientation sensor configured to detect orientation data, an image sensor configured to detect image data, a humidity sensor configured to detect humidity data, a location sensor configured to detect location data, or an input device configured to receive an input from an occupant of the vehicle,
  comparing the sensor data from the first sensor and the baseline data level of the first sensor, and
  verifying that the vehicle is at least partially submerged in water based on the sensor data from the second sensor; and adjusting, by the ECU, at least one feature of the vehicle in response to the determination that the vehicle is at least partially submerged in water, the at least one feature being least one of a window of the vehicle, a seat belt of the vehicle, a door of the vehicle, an engine of the vehicle, or a motor/generator of the vehicle.

14. The method of claim 13, wherein the at least one feature is an engine or a motor/generator of the vehicle, and wherein the adjusting, by the ECU, of the engine or the motor/generator of the vehicle in response to the determination that the vehicle is at least partially submerged in water comprises automatically driving the vehicle to a location where the vehicle will not be at least partially submerged in the water.

15. The system of claim 1, wherein the second sensor is at least one of a moisture sensor configured to detect moisture data, an orientation sensor configured to detect orientation data, an image sensor configured to detect image data, a humidity sensor configured to detect humidity data, a location sensor configured to detect location data, or an input device configured to receive an input from an occupant of the vehicle.

16. The vehicle of claim 7, wherein the second sensor is at least one of a moisture sensor configured to detect moisture data, an orientation sensor configured to detect orientation data, an image sensor configured to detect image data, a humidity sensor configured to detect humidity data, a location sensor configured to detect location data, or an input device configured to receive an input from an occupant of the vehicle.

* * * * *